United States Patent
Golec

(10) Patent No.: US 10,908,632 B2
(45) Date of Patent: Feb. 2, 2021

(54) DEVICE AND METHOD FOR USE IN CYCLING

(71) Applicant: Marcin Golec, London (GB)

(72) Inventor: Marcin Golec, London (GB)

(*) Notice: Subject to any disclaimer, the term of this patent is extended or adjusted under 35 U.S.C. 154(b) by 0 days.

(21) Appl. No.: 16/377,334

(22) Filed: Apr. 8, 2019

(65) Prior Publication Data

US 2019/0310679 A1 Oct. 10, 2019

(30) Foreign Application Priority Data

Apr. 9, 2018 (DE) .................. 10 2018 108 371

(51) Int. Cl.
| | | |
|---|---|---|
| *B62M 3/08* | (2006.01) | |
| *A63B 24/00* | (2006.01) | |
| *B62J 45/40* | (2020.01) | |
| *G05G 1/38* | (2008.04) | |
| *G01B 5/24* | (2006.01) | |

(52) U.S. Cl.
CPC .............. *G05G 1/38* (2013.01); *A63B 24/00* (2013.01); *B62M 3/08* (2013.01); *B62M 3/086* (2013.01); *G01B 5/24* (2013.01); *B62J 45/40* (2020.02)

(58) Field of Classification Search
CPC ........ B62M 3/08; B62M 3/083; B62M 3/086; B62K 2207/00; G01B 5/24; A63B 24/0006; A63B 24/0062; B62J 2099/002; B62J 45/40; A61B 5/221
See application file for complete search history.

(56) References Cited

U.S. PATENT DOCUMENTS

| | | | |
|---|---|---|---|
| 5,269,081 A | 12/1993 | Gray | |
| 9,248,341 B2* | 2/2016 | Tuulari | ................... H04L 67/12 |
| 9,402,578 B2* | 8/2016 | Tetsuka | ................ A61B 5/7455 |
| 9,551,623 B2* | 1/2017 | Biermann | .......... A63B 24/0062 |
| 2006/0248965 A1* | 11/2006 | Wyatt | .................. A61B 5/0002 |
| | | | 73/862.391 |
| 2007/0245835 A1* | 10/2007 | Hauschildt | ............. A61B 5/221 |
| | | | 73/862.391 |
| 2010/0024590 A1* | 2/2010 | O'Neill | ................... G01L 3/242 |
| | | | 74/594.1 |
| 2011/0087446 A1 | 4/2011 | Redmond et al. | |
| 2013/0019700 A1* | 1/2013 | Matsumoto | .............. B62J 99/00 |
| | | | 73/865.4 |
| 2013/0210583 A1* | 8/2013 | Kametani | ................ B62J 99/00 |
| | | | 482/8 |
| 2015/0025816 A1* | 1/2015 | Ross | ....................... A43B 17/00 |
| | | | 702/44 |
| 2015/0177083 A1 | 6/2015 | Redmond | |

(Continued)

FOREIGN PATENT DOCUMENTS

| | | | | |
|---|---|---|---|---|
| DE | 102015010999 | 2/2016 | | |
| EP | 2801515 A1 * | 11/2014 | ............. | B62M 6/50 |

(Continued)

*Primary Examiner* — Luis A Gonzalez
(74) *Attorney, Agent, or Firm* — Mark M. Friedman

(57) ABSTRACT

The present invention is directed to a sensor for detecting the angle of a bicycle shoe or bicycle pedal in respect to a predetermined level and to a method of using a sensor to detect this angle. The sensor can be connected to a signaling device to notify the cyclist when the angle is less than 20 degrees such that the cyclist can lift one or both of his heels to exert more optimal power to the bicycle pedal.

18 Claims, 2 Drawing Sheets

(56) References Cited

U.S. PATENT DOCUMENTS

| | | | |
|---|---|---|---|
| 2015/0253210 A1* | 9/2015 | Ashby | A61B 5/6807 702/41 |
| 2015/0367176 A1* | 12/2015 | Bejestan | G06F 19/3481 482/9 |
| 2016/0052583 A1 | 2/2016 | Sasaki | |
| 2017/0296896 A1 | 10/2017 | Shen et al. | |
| 2018/0268668 A1* | 9/2018 | Tetsuka | G01D 5/14 |

FOREIGN PATENT DOCUMENTS

| | | | |
|---|---|---|---|
| WO | 2009082215 | | 7/2009 |
| WO | 2009082215 A1 | | 7/2009 |
| WO | 20180058270 A1 | | 4/2018 |
| WO | WO-2018058270 A1 * | | 4/2018 |

* cited by examiner

DEVICE AND METHOD FOR USE IN CYCLING

TECHNICAL FIELD

The present invention relates to a bicycle pedal and shoe combination, to a method of measuring the position of the bicycle pedal and shoe combination, to a bicycle shoe and to a bicycle pedal.

BACKGROUND TO THE INVENTION

Multiple methods and devices have been developed to optimize bicycle riding and in particular to improve pedaling efficiency and effectiveness. To monitor the body and leg positioning, bicyclists have been filmed with a camera during indoor training sessions using specialized equipment. Using computer software, a specialist person can give the rider feedback how to improve their pedaling style. However, it is only possible to record such films when cyclists ride indoors on stationary turbo trainer in special bike studios supplied with the specialized equipment. Such training sessions are generally expensive as they require a specialist to run the fragile equipment and often such sessions only last for up to 1 hour. We noted also that no such devices are actually known for outdoor riding. Also, once cyclists become tired during the ride, their body positioning unconsciously changes, often dramatically. Even if cyclists train extensively on improving their pedaling technique and body positioning, they generally do not maintain their position during outdoor riding for extended periods of time. Accordingly, we have found that there remains a need not only to diagnose the cyclist's body positioning, but also to advise cyclists on how to improve their pedaling effectiveness while riding in particular outdoors, with minimal interference in the cycling, on their own and independent of other people, for extended periods and for low costs.

SUMMARY OF THE INVENTION

The present inventor has surprisingly found a way to increase the cyclist's pedaling effectiveness and efficiency, leading to greater bicycle speed and greater rider efficiency.

According to one embodiment, the invention is directed to a bicycle pedal and shoe combination comprising one or more sensors wherein at least one sensor is adapted to detect an angle of the pedal and shoe in respect to a predetermined level, preferably the tangent T to the two bicycle wheels or alternatively the horizontal level.

In the bicycle pedal and shoe combination, preferably the at least one sensor is an accelerometer. Preferably, the sensor is electronically connected to a signaling device and the signaling device is adapted to provide a signal when the sensor detects that the angle is less than 20 degrees, preferably less than 0 degrees, above the predetermined level. Preferably, the at least one sensor is integrated in or attached to the bicycle pedal or the bicycle shoe and the signaling device is adapted to vibrate and is integrated in or attached to the bicycle pedal or the bicycle shoe.

According to embodiment, the invention is directed to a method of determining the angle of the bicycle pedal and shoe combination by using one or more sensors, wherein at least one sensor detects an angle of the pedal platform where the shoe sole is attached compared to a predetermined level, preferably the tangent T to the two bicycle wheels or alternatively the horizontal level.

In the method of the invention, preferably, the at least one sensor is an accelerometer. Preferably, the sensor is electronically connected to a signaling device and the sensor, upon detecting that the angle is less than 20 degrees, preferably less than 0 degrees, above the predetermined level, instructs the signaling device to provide a signal. Preferably, the at least one sensor is integrated in or attached to the bicycle pedal or the bicycle shoe and the signaling device is adapted to vibrate or give audible signal and is integrated in or attached to the bicycle pedal or the bicycle shoe. Preferably, a further sensor is attached to the bicycle frame and the at least two sensors can communicate with each other and the further sensor serves as a point of reference.

According to further embodiment, the invention is directed to a bicycle shoe comprising a bicycle cleat that is attached to the bottom of a shoe sole wherein the shoe sole is made of a rigid material, preferably made of carbon or glass fibers, wherein the shoe further comprises one or more sensors, wherein at least one sensor is integrated in or attached to the shoe, preferably in the shoe sole, and is adapted to detect an angle of the shoe sole compared to a predetermined level, preferably the tangent T to the two bicycle wheels or alternatively the horizontal level.

The at least one sensor of bicycle shoe of the invention is preferably an accelerometer. Preferably, the bicycle shoe further comprises a vibration signaling device that is integrated in or attached to the shoe.

According to further embodiment, the invention is directed to a bicycle pedal comprising a clip-in mechanism for a bicycle shoe cleat, the bicycle pedal further comprising one or more sensors, wherein at least one sensor is integrated in or attached to the pedal, preferably at the bottom of pedal, and wherein the at least one sensor is adapted to detect an angle of the bicycle pedal platform compared to a predetermined level. Preferably, the predetermined level is the tangent T to the two bicycle wheels. Alternatively, the predetermined level is the horizontal level.

In the bicycle pedal of the invention, preferably the at least one sensor is an accelerometer. Preferably, the bicycle pedal comprises a vibration signaling device integrated in or attached to the pedal, wherein the sensor is adapted, upon detecting that the angle of the pedal is less than 20 degrees, preferably less than 0 degrees, above the predetermined level, to instruct the signaling device to provide a signal.

For more effective and efficient force during cycling, the heel of the foot should be moved upwards versus the front of the foot, such that the plane of the foot sole is kept at an angle compared to the predetermined level. This is sometimes called "keep the heel up" or the "relative heel position". According to the invention and for technical purposes, this angle between the plane of the foot sole and the predetermined level can be visualized or determined, first by drawing, from side-perspective, a straight line between the skin underneath the first metatarsal bone of the foot and the heel bone of the foot inserted in the bicycle shoe and attached to the bicycle pedal, subsequently, by determining the angle between this line and the predetermined level. It will be understood that when the heel is positioned higher than the first metatarsal bone, then the angle of this line with the predetermined level is positive and this is according to the present invention (positions A, C and D in FIG. 1) or in other words the plane of the foot sole in direction of the heel is upwards. If the heel is however lower than the first metatarsal bone, then this angle is negative and this is not preferred (position B in FIG. 1).

According to the invention, the present inventor surprisingly found that a sensor in the bicycle pedal and shoe combination can be used to determine the angle of the plane of the foot sole compared to the predetermined level. Wishing to alert the cyclist when he lowers his heel position during cycling for instance outdoors, he realized that the cyclist's foot tightly rests on the inner foot sole and is tightly connected to the inside of the bicycle shoe. Further, the bicycle shoe has a rigid sole and is tightly fixed to the bicycle pedal, typically by means of clip-ins. Indeed, since the bicycle shoe is tightly fitted to the cyclist's foot, the bicycle shoe sole is rigid and the bicycle shoe is again tightly fixed to the bicycle pedal using cleats, the angles between each of these features (foot, shoe, pedal) remain the same during cycling. The present inventor realized that due to these tight connections, determination of the angle of the foot sole plane can be based and derived from angle measurements of the sensor located at each of the features of the bicycle pedal and shoe combination.

Accordingly, the sensor located in the bicycle pedal and shoe combination detects the angle versus a predetermined level. Preferably, the predetermined level is the tangent T to the two bicycle wheels. Alternatively, the predetermined level is the horizontal level. To arrive at the angle of the plane of the foot sole, the detected angle may need adjustment for so-called intermediate angles; these are defined as angles (in the direction of rotation) between the foot and the shoe, on the shoe sole surface, between the shoe and the pedal, and on the pedal upper surface. An example thereof could be an angle introduced by the clip-in mechanism that might push down the upper surface of the bicycle pedal. Importantly however, any such intermediate angle remains substantially constant during cycling due to the above-mentioned tight connections and thus these can easily be adjusted for during sensor calibration or else during the processing of the sensor-detected output. For the purpose of the invention, it is assumed that the intermediate angles are zero or properly calibrated for and the sensor-detected angle corresponds to the angle of the plane of the foot sole.

Accordingly, the present invention uses a sensor to measure the angle of the bicycle pedal and shoe combination to a predetermined level, preferably the tangent T to the two bicycle wheels, alternatively, the horizontal level. This angle represents—or can directly be processed to—the angle of the side view of the foot sole plane as compared to the predetermined level, which angle indicates if the heel is correctly lifted or not. The sensor measurements may be stored for later review. But instant feedback from the sensor to the cyclist to lift his heel is preferably provided in order to instantly improve cycling efficiency and effectiveness. Hence, it is preferred to detect the angle of each of the cyclist's heels and alert the cyclist to lift one or both of his heels when the angle of the heel is below the predetermined angle.

The present invention is directed to alleviating the problem of cyclists dropping their heels while cycling and provides a sensor that is adapted to detect the angle of the bicycle pedal and shoe combination, preferably the shoe sole or the pedal platform, versus the predetermined level. Recording or signaling this angle can serve as an effective, even instant reminder for the cyclist to lift his/her heel, allowing the cyclist to put pressure on the pedal more effectively, leading to a more powerful propelling force, resulting in a higher speed.

The present invention also offers one or more of the following benefits. The sensor of the invention has a low weight and small size, substantially not affecting the overall weight and volume of the bicycle, which is particularly important in competitive events. Further, the device is easy to install on the bicycle and does not interfere with the cycling movement or otherwise obstructing the cyclist. Importantly, the device offers the possibility of precise diagnosis of the position of the heel of the shoe. Optionally, information on the relative position of the heel over time can be stored in an electronic memory. Also, the relative position of the heel can be instantly signaled to the cyclist. Most interestingly, the invention allows for instant feedback on his/her relative heel position during outdoor cycling, for extended periods, at low cost and without the need for specialists or expensive equipment.

DETAILED DESCRIPTION OF THE INVENTION

The present invention will be now described in detail with reference to preferred embodiments thereof and with reference to the figures of the application.

Figure 1:
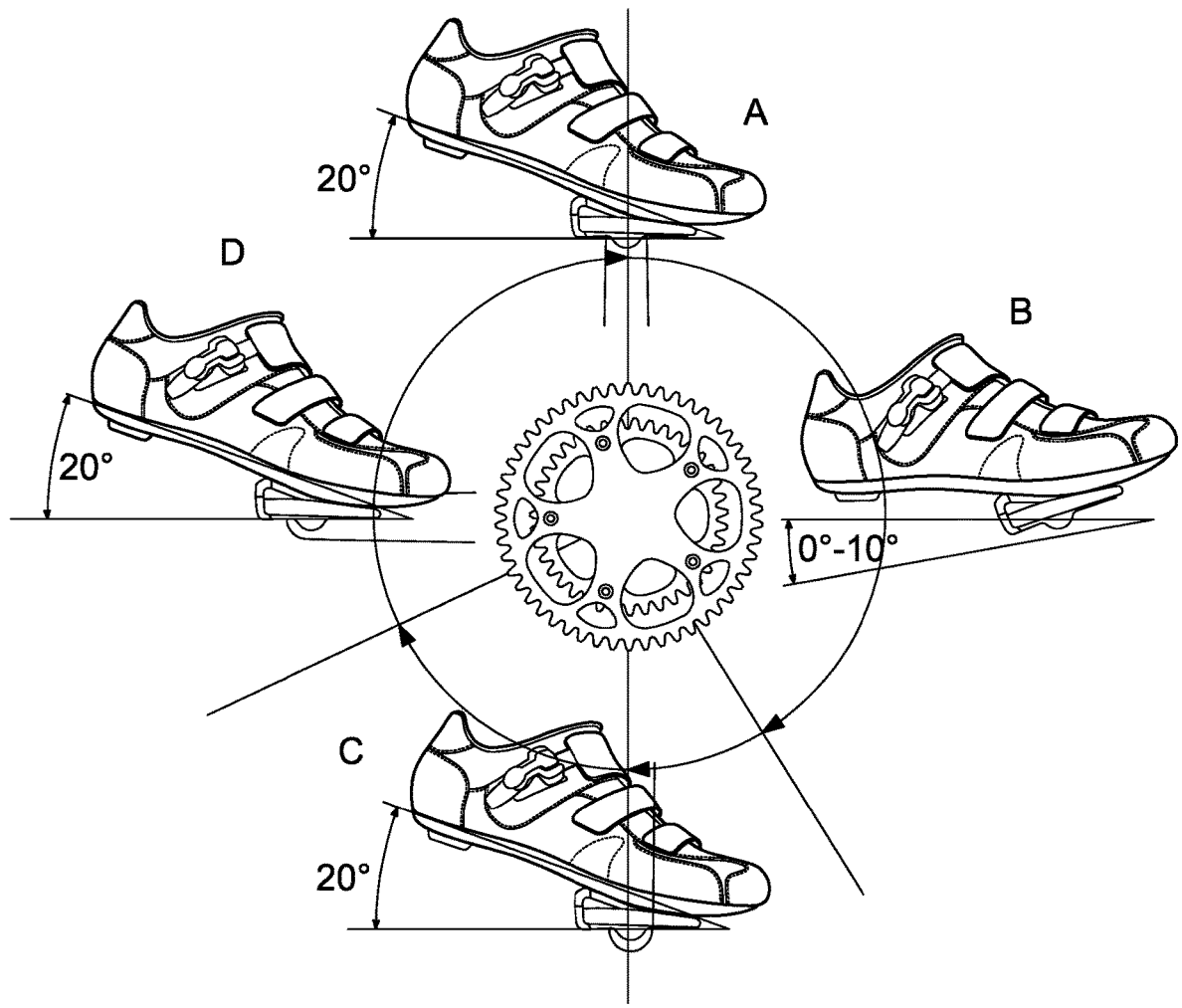
FIG. 1 is a graphic representation of the rotation of the bicycle pedal and shoe combination on a bicycle.

FIG. 1 is a graphic representation of the rotation of the bicycle pedal and shoe combination on a bicycle. In positions A, C and D, the pedal shoe combination is respectively at the top, at the bottom and on the upwards side of the rotation and the heel (more precisely, the plane of the foot sole) is lifted 20 degrees above the predetermined level, allowing optimal force transfer from the body to the pedal. In position B, the pedal shoe combination is on the downwards side of the rotation (where the biggest pushing forces occur) and, importantly, the heel and the shoe have however been lowered compared to the predetermined level to an angle of below 0 (between 0 and −10) degrees. The sensor integrated in or attached to the pedal or the shoe detects that the angle is below the predetermined angle and instructs a signaling device to alert the cyclist to lift his heel upwards.

The figure illustrates how the angle of the pedal and shoe combination (or part thereof) can be conveniently visualized using a side perspective of the pedal and shoe combination by drawing a line that represents the angle that is determined for the foot sole plane. The line may for instance be drawn on the shoe at the level of the foot sole inside the shoe. This line can be compared to a line with a predetermined level, preferably the tangent T to the two bicycle wheels, or alternatively, the horizontal level. The angle between the resulting parallel or forward-converging two lines represents the angle of the foot sole plane.

Figure 2:
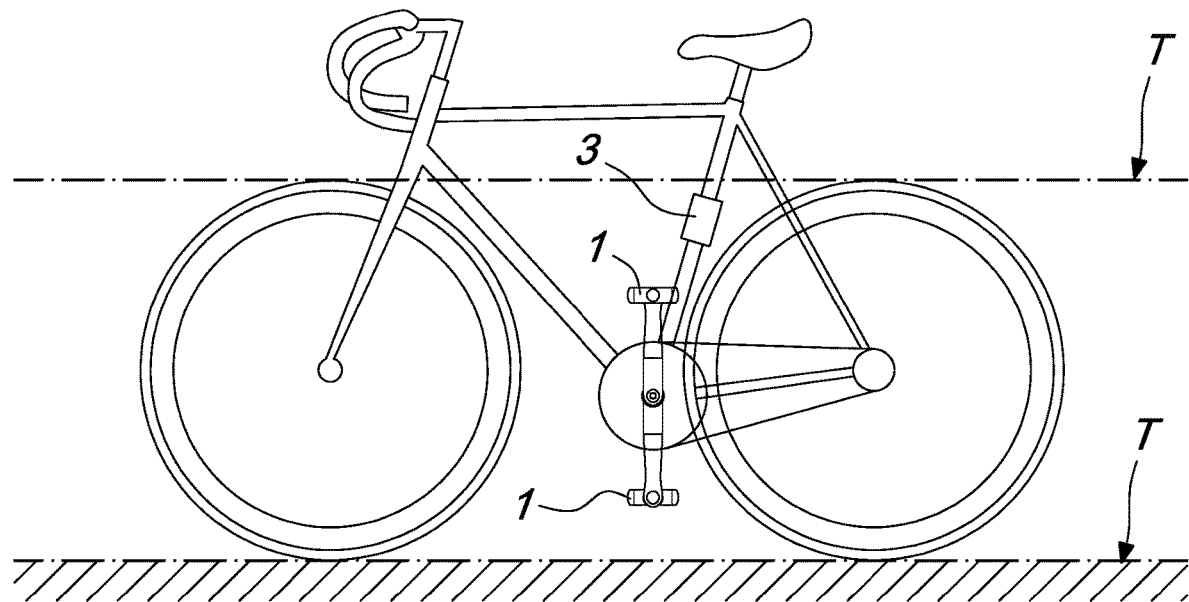
FIGS. 2 and 3 are graphic representations of a bicycle with a frame, saddle, bicycle steer, bicycle wheels, and pedals.
Figure 3:
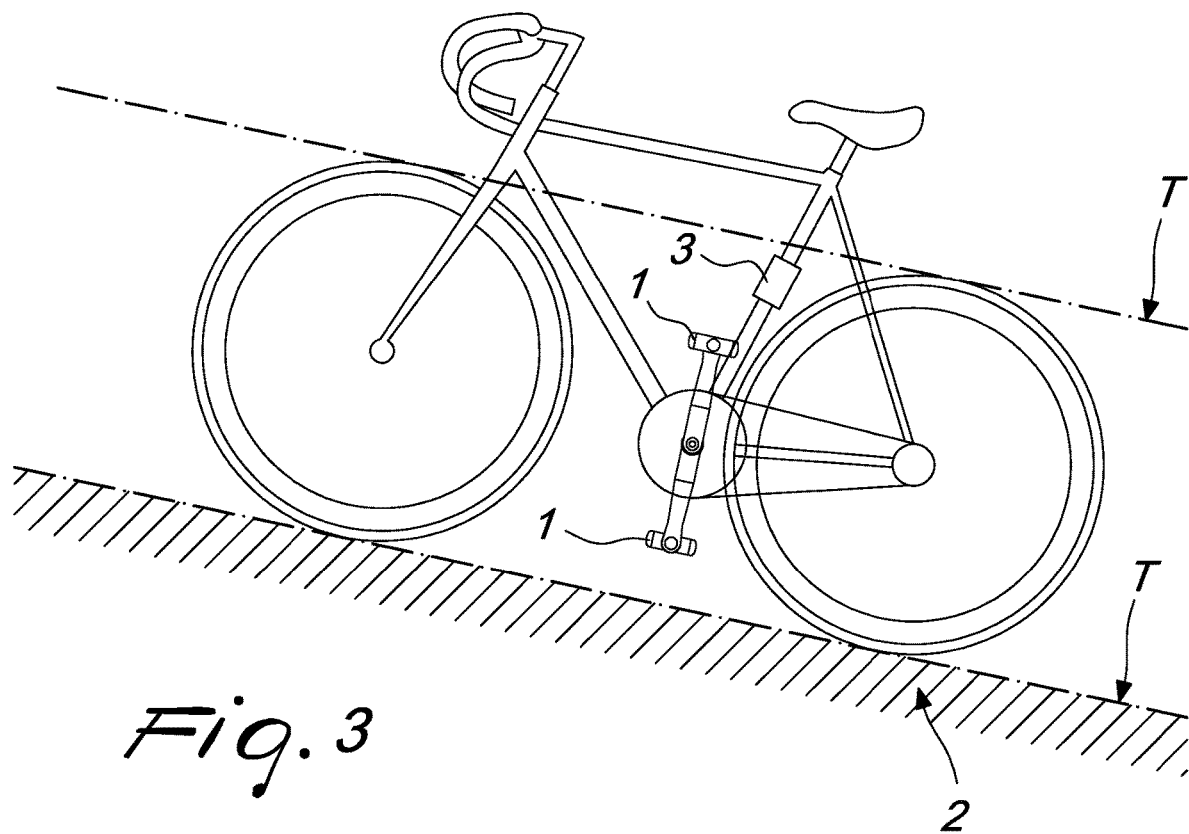

FIGS. 2 and 3 are graphic representations of a bicycle with a frame, saddle, bicycle steer, bicycle wheels, and pedals. Road surface 2 is horizontal in FIG. 2. Road surface 2 is inclined in FIG. 3. Each of the pedals in FIGS. 2 and 3 is provided with a sensor 1 (preferably an accelerometer). A further sensor 3 (preferably an accelerometer, more preferably in combination with a gyroscope) is attached to the frame in FIG. 3 to assist in determining the predetermined level on an inclining (or declining) road surface. Sensor 3 in FIG. 2 is optional as the predetermined level corresponds to the horizontal level. Tangent T is the line that corresponds to the tangent to both wheels, as is evident from FIGS. 2 and 3. It will be understood that this tangent T can be place either at the top or at the bottom of the bicycle wheels. Preferably, tangent T represents the predetermined level. On the flat surface of FIG. 2, tangent T corresponds with the horizontal level. On an inclining surface of FIG. 3, tangent T also has an inclination compared to the horizontal level (and it will be understood that on a declining surface tangent T will have an inclination).

According to the invention, the sensor preferably detects an angle between the pedal and/or of the tightly attached shoe sole as compared to a predetermined level, preferably, the tangent T to the two bicycle wheels and alternatively, the horizontal level. The horizontal level is a term well-known in the art and represents the plane perpendicular to the gravitation factor of the earth. The horizontal level may sometimes be called the earth factor. Preferably, the sensor is calibrated before use which can take into account any intermediate angles as defined above. Generally, sensor output processing takes into account calibration and/or other variations in the positioning or signaling in a manner that is well-known to the skilled person. Tangent T is illustrated in FIGS. 2 and 3 and is represented by the tangent to the two circles that are defined by the two bicycle wheels.

Though the present description and claims primarily reference measuring the angle of the bicycle pedal, the shoe or—generally—the bicycle pedal and shoe combination with a sensor, the person skilled in the art will appreciate that other solutions for measuring the position of the relative heel position of the cyclist are encompassed by the present description and claims, such as applying a sensor in other regions of the pedal or shoe including the insole of the shoe or applying a sensor directly for instance at the heel of the cyclist or the heel of the shoe with a plaster or applying the sensor on a sock or the like worn by the cyclist.

The sensor of the invention may be mechanical and/or electronical and may for instance also consist of multiple elements such as one or more emitters and receivers. The sensor of the invention is preferably an accelerometer or a set of two or more accelerometers. An accelerometer device is well-known in the art. The invention may use an accelerometer with 1 axis, but preferably uses an accelerometer with at least 2 axes (bi-axial) and may also use a tri-axial accelerometer. The invention may use also inclinometer sensor. Small size and low weight make an accelerometer sensor particularly beneficial for use according to the invention during cycling.

Preferably, the sensor is placed on the pedal, on the shoe, on an insole of the shoe, on a sock which can be worn by the cyclist, on a strap which can be worn by the cyclist at an appropriate location of his foot or body or directly on the cyclist's foot. In a preferred embodiment, the at least one sensor is attached to the pedal platform magnetically.

The sensor is preferably integrated in or attached to the pedal to optimally detect the angle of the pedal compared to a predetermined level. It will be understood that the cyclist preferably uses two sensors during cycling, one for each pedal-shoe combination on a bicycle to monitor the relative heel position on both legs compared to the predetermined level. Thus, the cyclist beneficially uses at least two sensors for measuring the angle of the bicycle pedal and shoe combination on a bicycle, on the left and on the right pedal-shoe combination.

The sensor of the invention may be used in combination with a memory device for storing the detected angle over time, for example a bicycle computer. The sensor may for instance be supplied with power from a battery. Other power supplies like solar power via appropriate solar cells are conceivable. The sensor is preferably connected to a computer with algorithms for processing of the signal. The output of the sensor may be recorded.

To achieve greater accuracy, preferably a further sensor (preferably an accelerometer or a gyroscopic sensor/emitter) is attached to a bicycle, preferably to the bicycle frame, as a point of reference for the sensor of the invention. Preferably, the sensor of the invention and the further sensor are able to communicate with each other and serve as reference points, for instance beneficially increasing the accuracy of angle measuring.

The signal of the sensor of the invention is preferably calibrated, a procedure that is well-known in the art. Preferably, calibration takes into account any angles present between the fixed foot, shoe and pedal such that the angle determined closely corresponds to the actual angle of the plane of the foot sole compared to the predetermined plane.

Preferably, the sensor of the invention is used in combination with a signaling device. The sensor and the signaling device are connected, for instance by wire or radio/Bluetooth signals. The signaling devices preferably provides a signal to the cyclist when the output of the sensor reaches a (preferably preset) threshold value which reflects that the cyclist's heel (more precisely, the plane of the foot sole) drops as compared to the predetermined level below a predetermined angle, preferably less than 20 degrees above the predetermined level, 10 degrees above the predetermined level and most preferably 0 degrees above the predetermined level. The signaling device may be mechanical but is preferably electronical. Preferably, the signaling device provides a sound, visual or vibration signal. Examples of sound signals are beep or buzz, examples of visual signals are light (such as flickering lights) or a display.

Cyclists preferably use specialized bicycle shoes with a rigid sole made for instance of carbon fibers or glass fibers. The bicycle shoe sole has a tip and a heel. Bicycle shoes are further generally connected in well-known manner to the pedal, generally referred to in the art as clip-ins. Different forms of connection are known in the art. Preferably, cleats are tightly fixed under the front part of a shoe sole and the cleats engage with a specialized bicycle pedal, resulting in a tight/fixed connection between the cyclist's foot, the rigid shoe sole, the cleat and the specialized pedal during cycling. As of course is well-known, the cleat of bicycle shoe releases from the pedal upon sideways movement. According to the invention, the angle of the pedal or the shoe is measured versus a predetermined level. The angle can be stored in memory over time. Preferably, when the detected angle indicates that the heel has dropped below a predetermined point (threshold), a signal is provided to the cyclist.

Preferably, two bicycle pedals are attached to a crank of a bicycle. Preferably, the pedal has an upper surface that comprises a bicycle shoe cleat clip-in mechanism to provide for a tight connection with the bicycle shoe cleat. Preferably, the bicycle pedal further comprising one or more sensors, wherein at least one sensor is integrated in or attached to the pedal, preferably at the bottom of pedal, and wherein the at least one sensor is adapted to detect an angle of the bicycle pedal compared to a predetermined level. Preferably, the bicycle pedal comprises a vibration signaling device integrated in or attached to the pedal. The sensor is preferably adapted upon detecting that the angle of the pedal is less than 20 degrees, preferably less than 0 degrees, above the predetermined level, to instruct the signaling device to provide a signal.

The sensor is preferably connected to the pedal-shoe combination, in one embodiment to the shoe and in another embodiment to the pedal. More preferably, the sensor is connected to the pedal, and particular in the pedal body. Preferably, the sensor is connected with the pedal-shoe and preferably integrated in or attached to the shoe or pedal, more preferably in the pedal, particularly in the body of the pedal.

In a preferred embodiment of the invention, an accelerometer determines the angle of the plane of the foot sole compared with the predetermined level. The accelerometer is integrated in or attached to the shoe, preferably at heel region of the sole and is connected—preferably by wire—to a vibration signaling device that is placed on the side of the shoe, preferably against the foot. The vibration signaling device is integrated in or attached to the shoe on the inside such that any vibration can be felt on the inside of the shoe by the inserted foot. When the cyclist continues to drop his heel below a predetermined angle, the accelerometer detects that the angle of the plane of the foot sole compared to the predetermined level is—for instance—below 0 degrees and instructs the vibration signaling device to vibrate and alert the cyclist to lift his heel. An auditory or visual signal may be used in addition or instead. According to a further embodiment, the invention relates to a bicycle shoe comprising an accelerometer integrated in or attached to the shoe. Preferably, the shoe further comprises a vibration signaling device.

Accelerometers often use a proof mass that—upon acceleration—displaces a spring. A proof mass—or mass—is a well-determined weight, Other options are accelerometers in MEMS (Micro Electro-Mechanical Systems) that may for instance comprise a cantilever beam with a mass or that may use a heated mass. Mass displacement is commonly converted to an electrical signal using piezoelectro, piezoresistive or capacitive components or—in case of using a heated mass—a temperature sensor.

As referred to above, inclinometers can also be used to measure the angle to the predetermined level, both mechanically and electronically. An inclinometer and an accelerometer both measure the angle versus gravity generally using the same technologies to do so for the present particular application of measuring the angle of the cyclist's heel to the predetermined level. Hence and for simplicity sake, for the purpose of the invention, inclinometers are considered—and are defined as—accelerometer.

As discussed above, accelerometers can be combined with a gyroscope. A gyroscope is a device that is well-known to the skilled person. Such combination can for instance be used to address and overcome any errors in the angle measurements, for instance due to external factors, such as vibrations or other rapid movements. Computer algorithms can be formulated and used to determine the angles and levels, preferably using the output from the accelerometer and the output from the gyroscope. According to the invention, preferably a sensor is used that can be attached to the bicycle frame wherein the sensor comprises a combination of at least one accelerometer and at least one gyroscope. This sensor is preferably used to determine the predetermined level. Preferably, each bicycle pedal comprises a further accelerometer in (preferably wireless) connection with the combination device on the frame. Thus, preferably at least 3 accelerometers are used; 1 sensor to one pedal, a second sensor to the other pedal and a third sensor to the bicycle frame (see FIG. 3).

According to a preferred embodiment of the invention, the angle of each cyclist's feet to the predetermined level is separately determined. Preferably, the angle measurement uses an accelerometer on each of the bicycle's two pedals, thus requiring a total of two accelerometers. In addition, a combination of an accelerometer and a gyroscope is mounted on the bicycle frame. This combination is preferably used to calibrate the frame to the predetermined level. This combination is connected, preferably wirelessly, with the two pedal accelerometers. The angle of each foot to the predetermined level can subsequently—separately—be determined using the angle measured with each pedal accelerometer and the measured angle and calibration of the combined accelerometer-gyroscope on the bicycle frame.

According to a further preferred embodiment, the invention relates to a method of determining the relative foot heel position of a cyclist by using a sensor, wherein the sensor is integrated in or attached to the pedal, preferably in the body of the pedal, and is adapted to detect an angle between the pedal and the predetermined level. Upon detecting that the angle of the pedal compared to the predetermined level is less than 20 degrees above the predetermined level (or less than 10 degrees or preferably less than 0 degrees above the predetermined level), the sensor instructs the signaling device to provide a signal to the cyclist, preferably a vibration signal, to lift his heel. Preferably, the bicycle pedal comprises an accelerometer integrated in or attached to the pedal body. Preferably, the pedal further comprises a vibration signaling device. An auditory or visual signal may be used in addition or instead. In a preferred embodiment, a sensor and a signaling device (preferably a vibration signaling device) is integrated in each of the two pedals. In this manner, the cyclist can be alerted which heel to lift.

The invention is further directed to a method of determining the position of the bicycle pedal and shoe combination using one or more sensors. At least one sensor detects an angle between the bicycle pedal and shoe combination as compared to a predetermined level. The detected angle is representative for the angle of the plane of the foot sole. The detected angle can be used to determine the angle of the plane of the foot sole versus the predetermined level. The sensor is preferably integrated in or attached to the bicycle pedal or in the bicycle shoe. Preferably, a further sensor is attached to the bicycle frame. Preferably the further sensor can communicate with the one or more sensors of the invention and the further sensor can serve as a point of reference, resulting in more accurate angle detection.

The invention is further directed to a computer implemented method wherein electronic signals from one or more sensors in a bicycle pedal and shoe combination are used to detect an angle of the pedal and shoe in respect to a predetermined level. Preferably, the computer implemented method uses algorithms. Preferably, the method uses a sensor connected to the bicycle frame wherein the sensor comprises at least one accelerometer and at least one gyroscope for determining the predetermined level. Preferably the method uses electronic input from the bicycle frame sensor and from the at least one sensor on the bicycle pedal and shoe combination. Preferably, the method uses one or more electronic signals to determine the angle of the pedal and shoe in respect to a predetermined level. Preferably, the method uses a computer. Preferably, the method uses a wireless connection between the at least one sensor on the pedal and the computer. Preferably the method has a wireless connection between the computer and the signaling device. Preferably, any bicycle frame sensor is connected to the computer, more preferably wirelessly. According to the computer-implemented method, the computer receives input from the at least one sensor, applies the algorithms to determine the angle of the pedal and shoe in respect to a predetermined level. If the angle is lower than the pre-set value, then the computer can instruct the signaling device to provide a signal to the cyclist to lift which (or both) of his heels.

The present invention offers the cyclist the benefit of reminding the cyclist to use an optimal body positioning for achieving a higher cycling velocity by reminding the cyclist to lift his heels above a predetermined angle above a predetermined level.

The invention claimed is:

1. A bicycle pedal and shoe combination comprising:
a bicycle pedal attached to a bicycle frame in a rotatable manner;
a shoe comprising a heel and a rigid sole, the rigid sole defining a plane, the shoe being adapted to be a worn by a cyclist and, during cycling, to be rigidly attached to the pedal at a predetermined first angle between the pedal and the plane of the sole;
at least one sensor comprised in at least one of the heel and the pedal and adapted to detect a second angle between the pedal and shoe combination and a predetermined level;
a signaling device adapted to generate an alert if said second angle falls below a predetermined threshold; and
a further sensor attached to the bicycle frame and adapted to detect an inclination of the bicycle frame in a respect of a horizontal level, and to provide data indicative of the inclination to the at least one sensor,
wherein the at least one sensor is adapted to adjust said predetermined level in accordance with said data.

2. The bicycle pedal and shoe combination according to claim 1, wherein the at least one sensor is an accelerometer.

3. The bicycle pedal and shoe combination according to claim 1, wherein the at least one sensor is electronically connected to the signaling device and wherein the signaling device is adapted to provide a signal when the at least one sensor detects that the second angle is less than 20 degrees above the predetermined level.

4. The bicycle pedal and shoe combination according to claim 1, wherein the signaling device is integrated in or attached to the bicycle pedal, or is integrated in or attached to the bicycle shoe.

5. The bicycle pedal and shoe combination according to claim 1, wherein the signaling device is adapted to vibrate or/and generate a sound.

6. The bicycle pedal and shoe combination according to claim 1, further comprising a computer connected to the at least one sensor and to the further sensor, wherein the computer is adapted, upon detecting that the angle of the pedal is less than 20 degrees above the predetermined level, to instruct the signaling device to provide the signal.

7. A method of determining an angle of a bicycle pedal and shoe combination with respect to a predetermined level, wherein the bicycle pedal is attached to a bicycle frame in a rotatable manner, and wherein the shoe comprises a heel and a rigid sole, the rigid sole defining a plane, and wherein the shoe is adapted to be a worn by a cyclist and, during cycling, to be rigidly attached to the pedal at a predetermined first angle between the pedal and the plane of the sole; the method comprising:
detecting, using at least one sensor comprised in at least one of the heel and the pedal, a second angle between the pedal and shoe combination and the predetermined level;
detecting, using a further sensor attached to the bicycle frame, an inclination of the bicycle frame in a respect of a horizontal level, and communicating data indicative of the inclination to the at least one sensor; and
signaling, using a signaling device adapted to generate an alert, when said second angle falls below a predetermined threshold;
wherein the at least one sensor adjusts the predetermined level in accordance with said data.

8. The method according to claim 7, wherein the at least one sensor is an accelerometer.

9. The method according to claim 7, wherein the signaling device is integrated in or attached to the bicycle pedal, or is integrated in or attached to the bicycle shoe.

10. The method according to claim 7, wherein the signaling device is adapted to vibrate or/and generate a sound.

11. The method according to claim 7, further using a computer connected to the at least one sensor and to the further sensor, wherein the computer is adapted, upon detecting that the angle of the pedal is less than 20 degrees above the predetermined level, to instruct the signaling device to provide the signal.

12. The method according to claim 11, wherein the computer is adapted, upon detecting that the angle of the pedal and shoe is less than a predetermined angle above the predetermined level, wherein the predetermined angle is in a range between 0 and 20 degrees and wherein the predetermined level is the tangent of the two bicycle wheels, to instruct the signaling device to provide a signal.

13. A bicycle having a bicycle frame and a bicycle pedal, the bicycle pedal comprising a mechanism for tightly fixing a bicycle shoe to the bicycle pedal at a predetermined first angle, wherein the bicycle shoe has a rigid sole defining a plane, the bicycle comprising:
at least one sensor integrated in or attached to either the pedal or the bicycle shoe, and adapted to detect an angle of the bicycle pedal compared to a predetermined level;
a signaling device adapted to generate an alerting signal if the heel of a cyclist wearing the bicycle shoe drops below a predetermined angle as compared to the predetermined level and
a further sensor attached to the bicycle frame and and adapted to detect an inclination of the bicycle frame in a respect of a horizontal level, and to provide data indicative of the inclination to the at least one sensor,
wherein the at least one sensor is adapted to adjust said predetermined level in accordance with said data.

14. The bicycle according to claim 13, wherein the at least one sensor is an accelerometer.

15. The bicycle according to claim 13, wherein the signaling device is a vibration signaling device integrated in or attached to the pedal.

16. The bicycle according to claim 13, further comprising a computer connected to the at least one sensor and to the further sensor, wherein the computer is adapted, upon detecting that the angle of the pedal is less than 20 degrees above the predetermined level, to instruct the signaling device to provide the signal.

17. The bicycle according to claim 16, wherein the computer is adapted, upon detecting that the angle of the pedal is less than a predetermined angle above the predetermined level, wherein the predetermined angle is in a range between 0 and 20 degrees and wherein the predetermined level is the tangent of the two bicycle wheels, to instruct the signaling device to provide the signal.

18. The bicycle according to claim 16, wherein the computer is adapted, upon detecting that the angle of the pedal and shoe is less than a predetermined angle above the predetermined level, wherein the predetermined angle is in a range between 0 and 20 degrees and wherein the predetermined level is the tangent of the two bicycle wheels, to instruct the signaling device to provide a signal.

\* \* \* \* \*